May 27, 1930.  A. J. CHANTER  1,759,935
BRAKE
Original Filed Feb. 27, 1926
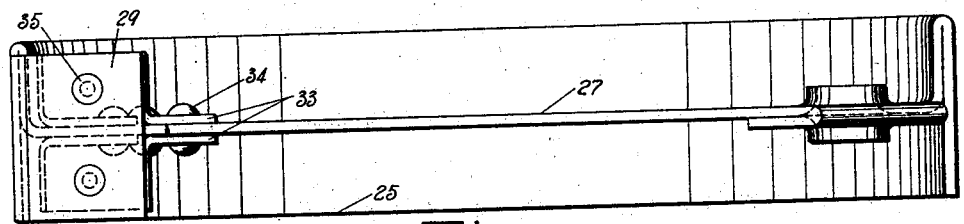
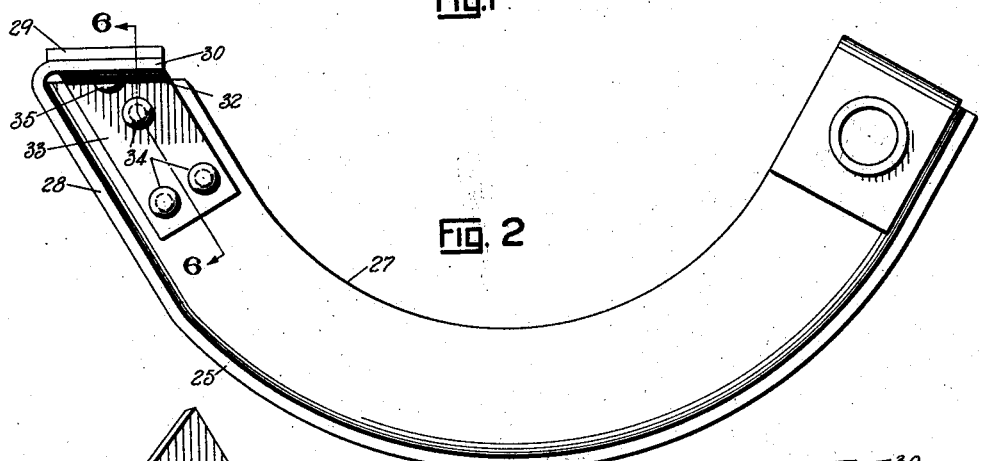
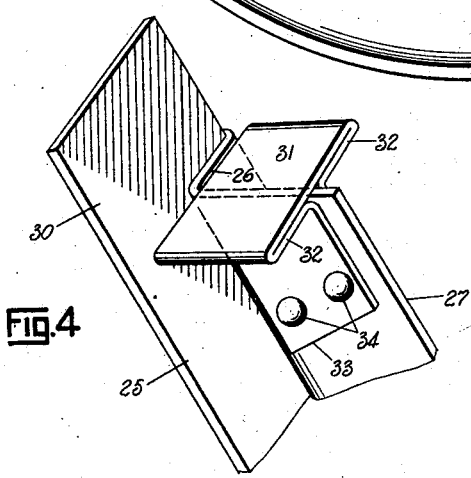
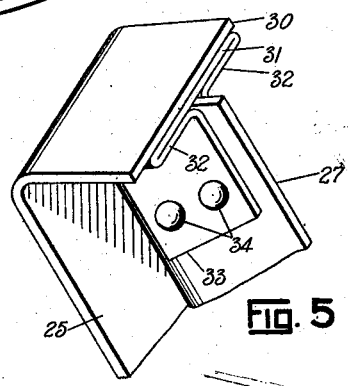
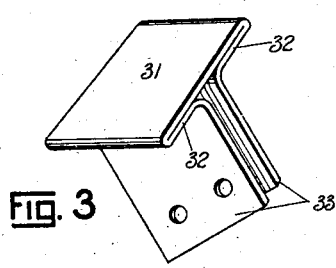
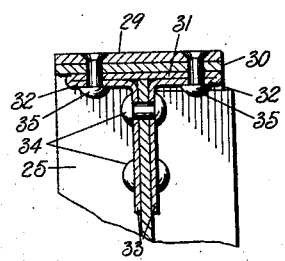
INVENTOR.
Arthur J. Chanter
BY
ATTORNEY Patented May 27, 1930

1,759,935

UNITED STATES PATENT OFFICE

ARTHUR J. CHANTER, OF SOUTH BEND, INDIANA, ASSIGNOR TO THE STUDEBAKER CORPORATION, OF SOUTH BEND, INDIANA, A CORPORATION OF NEW JERSEY

BRAKE

Original application filed February 27, 1926, Serial No. 91,115. Divided and this application filed January 23, 1928. Serial No. 248,785.

This invention relates to shoes for brakes of the internal-expanding type, and is a division of my co-pending application, Serial No. 91,115, filed February 27th, 1926.

The principal object of this invention is to form a brake shoe of a single piece of sheet metal whereby it will be light in weight, strong in construction and capable of being economically produced, particularly in quantities.

Another object is to provide a one-piece pressed metal brake shoe having a semi-circular brake lining supporting portion and a radial web, with a pressed metal T-shaped member secured to an end of the web to transmit thrust thereto.

A further object is to provide a one-piece pressed metal brake shoe having a semi-circular brake lining supporting portion and a radial web, with a pressed metal T-shaped member secured to an end of the web, a portion of the metal comprising the lining supporting portion being bent radially inwardly to abut against the T-shaped member, and a hardened steel cam contact member secured to the radially bent portion.

These being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention, Figure 1 is a plan view of the brake shoe looking toward the concave surface thereof.

Figure 2 is a side view of the brake shoe shown in Figure 1.

Figure 3 is a perspective view of the cam contact plate reinforcement.

Figure 4 is a perspective view illustrating the method in which the cam contact plate reinforcement is secured to the free end of the brake shoe.

Figure 5 is a perspective view showing the extended end of the brake shoe bent radially inwardly to abut against the reinforcement member, thus placing the shoe in condition to receive the cam contact plate.

Figure 6 is a sectional view taken on the line 6—6 of Figure 2.

Referring to the accompanying drawing in which like numerals refer to like parts throughout the several views, the brake shoe illustrated is of that type which is adapted to be anchored or pivoted on a pivot pin at one end and engaged by a cam at the other end to move the same into engagement with a rotatable brake drum. The brake shoe as illustrated in Figure 4, is provided with an arcuate brake lining attaching portion 25 which has the metal at one edge thereof bent upon itself as at 26 preferably into contact with the inner face of the portion 25. A portion of the metal comprising the reversely bent portion 26 is bent radially inwardly at the center line of the portion 25 to form a radial web 27 which provides the principal strengthening or reinforcing means therefor. It is evident, however, that the reversely bent portion 26 also imparts added strength and rigidity to the structure. It is also preferable to weld, bolt, rivet or otherwise secure the axial portion 25 and reversely bent portion 26 together to prevent the same from separating.

The forming of the metal to the shape described may be accomplished by either of two methods. First, the metal may be formed to the section shown in Figure 4, in a straight strip and then bent to the proper arcuate shape. This method is most satisfactory where the radial web 27 is not of very great depth. Secondly, if the radial web 27 is found to be of a depth too great to be easily drawn, the metal may first be formed cylindrical with the axial portion 25 and reversely bent portion 26 suitably separated, and then completely formed by successive forming steps to bring the axial portion 25 and reversely bent portion together as shown.

It may be found desirable to bring either one or both ends of the brake shoe inwardly, as illustrated at 28 in Figure 2, out of the path of the normally arcuate face of the lining attaching portion 25 in order to eliminate any possibility of the rivets or other securing means (not shown), which secure the ends of the brake lining (not shown) to the face 25, from possible contact with the brake drum (not shown).

In Figures 3 to 6 inclusive, a preferable method of forming the free end of the brake shoe is shown. This free end of the brake shoe receives the radial hardened cam contact plate 29 which takes the thrust of the conventional expanding cam (not shown). After the brake shoe is formed to shape, a portion of the end of the reversely bent portion 26 and radial web 27 is removed as shown in Figure 4, to provide a projecting tongue 30 of the face portion 25 equal in length to approximately the depth of the reinforcing web 27. A T-shaped reinforcing member formed from pressed metal to comprise a face portion 31, reversely bent edges 32 and spaced parallel arms 33 perpendicular thereto as illustrated in Figure 3, is secured to the radial web 27 by rivets 34 or any other suitable means. The face portion 31 of the reinforcing member is positioned radially perpendicular to the axial face 25 and the radial web 27 is received between the arms 33 of the reinforcing member as shown in Figure 4. The extending tongue 30 of the face 25 is then bent radially inwardly to abut against the face 31 of the reinforcing member as shown in Figure 5, in which position, it is welded, bolted, riveted or otherwise secured to the face 31. The hardened steel cam contact plate 29 is secured to the face 30, thus formed, by rivets 35 or any other suitable means as shown in Figure 6.

If desired, the brake shoe may be originally formed with the face portion 25 having a tongue 30 extending therefrom and projecting past the end of the reversely bent portion 26 and web 27. If the brake shoe is formed in this manner, it will not be necessary to cut away portions of the reversely bent portion 26 and web 27. It may be found desirable in some cases, to omit the projecting tongue 30 and secure the cam contact plate 29 directly to the cam supporting member shown in Figure 3.

It is readily apparent that the present invention provides a construction for the cam contact end of a pressed metal brake shoe which is very rigid and capable of withstanding hard usage.

Formal changes may be made in the specific embodiment of the invention described without departing from the spirit and substance of the broad invention, the scope of which is commensurate with the appended claims.

What I claim is:

A brake shoe comprising an arcuate lining surface having a projecting reinforcing web therefor, and provide a support for a cam contact member.

2. A pressed metal brake shoe comprising an arcuate lining attaching surface having a reversely bent portion terminating in a radial reinforcing web, and a pressed metal T-shaped stamping embracing the outer sides of said web to provide a support for a cam contact member.

3. A pressed metal brake shoe comprising an axial arcuate portion having a reversely bent portion terminating in a radial reinforcing web, and a T-shaped cam contact plate supporting member secured to a bend of said web.

4. A pressed metal brake shoe comprising an axial arcuate portion having a reversely bent portion terminating in a radial reinforcing web, and a cam contact plate supporting member having a pair of spaced arms secured to the sides of said radial web.

5. A pressed metal brake shoe comprising an axial arcuate portion having a projecting tongue and a reversely bent portion terminating in a radial reinforcing web, a T-shaped stamping secured to an end of said radial web, said tongue being bent to abut against said T-shaped stamping, and a cam contact plate secured to said tongue.

6. A pressed metal brake shoe having a cylindrical lining attaching surface and a radial web, a T-shaped stamping provided with spaced legs embracing said web, and an extended end on said surface bent into contact with the head of said T-shaped stamping to provide a support for a cam contact member.

7. A pressed metal brake shoe comprising an arcuate lining attaching surface, a radial reinforcing web therefor, a pressed metal stamping having a radial transversely extending head, the sides thereof being reversely bent and flanged to provide a pair of spaced arms telescoping an end of said radial web, a radial transversely extending tongue integral with said arcuate surface abutting against said head, and a cam contact plate secured to said head.

8. A brake shoe including a cylindrical friction part and a stiffening web, and comprising, in combination therewith, a thrust member engaging the end of the web and having a part engaging the inner face of an extension of the friction part and secured thereto.

9. A brake shoe including a brake lining supporting part and a stiffening web, and comprising, in combination therewith, a thrust member engaging the end of the web and having a part engaging and secured to the side thereof, said thrust member also being secured to the supporting part of said shoe at substantially right angles to said web.

10. A brake shoe including a brake lining supporting part and a stiffening web, and comprising, in combination therewith, a the web and having a part engaging and secured to the side thereof, the face of said thrust member also being secured to a part of said shoe at substantially right angles to said web.

11. A brake shoe including a brake lining supporting part and a stiffening web, and comprising, in combination therewith, a pressed metal T-shaped thrust member having the inner surface of its face portion engaging the end of the web, and having a part engaging and secured to the side of said web, the face portion of said thrust member also being secured to a part of said shoe.

12. A brake shoe including a brake lining supporting part and a stiffening web, and comprising, in combination therewith, a thrust member engaging the end and side of the web, said thrust member having parts extending at substantially right angles to each other, one of said parts being secured to said web and the other of said parts being secured to a part of said shoe.

13. A brake shoe comprising an arcuate lining attaching portion having a reversely bent portion terminating in a radial reinforcing web, and a T-shaped member having spaced arms telescoping an end of said web to provide a support for a cam contact member.

14. A brake shoe comprising an arcuate lining attaching portion having a reversely bent portion terminating in a radially reinforcing web, and a T-shaped member having a head extending radially of said arcuate lining attaching portion and a pair of spaced arms telescoping an end of said web to provide a support for a cam contact member.

15. A brake shoe comprising an arcuate lining attaching portion having a reversely bent portion terminating in a radially reinforcing web, and a pressed metal T-shaped member having a head extending transversely and radially of said attaching portion, said member being formed to provide a pair of spaced arms intermediate the edges of said head telescoping an end of said web to provide a support for a cam contact member.

16. A brake shoe comprising an arcuate lining attaching surface, a radially reinforcing web therefor, and a pressed metal T-shaped member having a head extending transversely and radially of said lining attaching surface, the sides of said head being reversely bent and flanged to provide means for securing said member to the web of said shoe.

Signed by me at South Bend, Indiana this 20th day of January, 1928.

ARTHUR J. CHANTER.

CERTIFICATE OF CORRECTION.

Patent No. 1,759,935.　　　　　　　　　　　　　　　Granted May 27, 1930, to

ARTHUR J. CHANTER.

It is hereby certified that error appears in the printed specification of the above numbered patent requiring correction as follows: Page 2, line 78, claim 3, for "a bend" read "an end"; and that the said Letters Patent should be read with this correction therein that the same may conform to the record of the case in the Patent Office.

Signed and sealed this 22nd day of July, A. D. 1930.

(Seal)　　　　　　　　　　　　　　　　　　　　　　　Wm. A. Kinnan,
　　　　　　　　　　　　　　　　　　　　　　　Acting Commissioner of Patents.